(12) United States Patent
Nguyen

(10) Patent No.: US 6,298,221 B1
(45) Date of Patent: Oct. 2, 2001

(54) ADAPTIVE RECEIVER LINEARITY TECHNIQUES FOR A RADIO TRANSCEIVER

(75) Inventor: Dien M. Nguyen, Encinitas, CA (US)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/053,842

(22) Filed: Apr. 1, 1998

(51) Int. Cl.[7] ............... H04B 1/38; H04B 1/10; H04B 1/06
(52) U.S. Cl. ............ 455/73; 455/63; 455/296; 455/234.1
(58) Field of Search .............. 455/73, 574, 69, 455/70, 570, 222, 296, 295, 303, 309, 310, 311, 305, 67.3, 67.1, 63, 78, 127, 231, 232.1, 234.1, 117, 501, 126, 114; 375/219, 285, 297, 346

(56) References Cited

U.S. PATENT DOCUMENTS

| 5,001,776 | * | 3/1991 | Clark ................................. 455/234.1 |
| 5,204,970 | * | 4/1993 | Stengel et al. ......................... 455/63 |
| 5,287,211 | * | 2/1994 | Grimes et al. ....................... 359/161 |
| 5,625,674 | * | 4/1997 | Paniccia, Jr. ..................... 455/114 X |
| 5,694,433 | * | 12/1997 | Dent ....................................... 455/63 |
| 5,732,341 | * | 3/1998 | Wheatley, III .................... 455/234.1 |
| 6,070,091 | * | 5/2000 | Hogevik ........................... 455/296 X |

* cited by examiner

*Primary Examiner*—Tracy Legree
(74) *Attorney, Agent, or Firm*—Fish & Richardson P.C.

(57) ABSTRACT

Characteristic of the transceiver is altered when intermodulation distortion is detected. This can increase bias to the LNA or reduce the signal to the LNA.

10 Claims, 4 Drawing Sheets

ADAPTIVE RECEIVER LINEARITY TECHNIQUES FOR A RADIO TRANSCEIVER

BACKGROUND OF THE INVENTION

CDMA telephones operate according to the IS-95 standard. These devices operate generally as shown in the block diagram of FIG. 1. The user speaks into a microphone 100. The audio from the microphone 100 is processed by processor 102, and amplified by high power amplifier (HPA) 104. The output of HPA 104 is coupled through duplexer 108 to antenna 110. Duplexer 108 allows both transmission and reception to occur at the same time.

Transmissions received from antenna 110 are coupled through duplexer 108 to low noise amplifier (LNA) 112. The output of LNA 112 is processed by processor 114, and reproduced to the user through speaker 116.

The duplexer 110 is not perfect. It allows some transmit-to-receive crosstalk shown as 109. A measure of the transmit to receive crosstalk is available for many duplexers.

The transmitter 110 communicates with a base station shown generally as 150. Different effects occur depending on the distance between the transmitter 110 and the base station 150. When the handset 99 is close to the base station 150, the transmitter needs to transmit a relatively low amount of power and receives a relatively large amount of power. However, when the handset 99 is far away from the base station 150, it needs to transmit a large amount of power to reach the base station, and it receives only a small amount.

Other handsets which are close by are also similarly transmitting a large amount and receiving a small amount. These other handsets transceive on different frequencies. However, non-linearities in the components cause addition and different products to be formed. The other close handsets effectively become interferers.

In addition, the transmitted signal beam leaks through the duplexer as 109 and also forms another interference signal.

Interferers in non-desired bands can be eliminated by filtering, even though they may in many cases be at a higher amplitude than the actual desired signal. However, non-linearities in the LNA and/or any mixers, can cause inter-modulation distortion which effectively mixes these products together. The noise from the undesired signals may be mixed into the band of desired signals. Since the noise is in the desired band, it becomes more difficult to filter out. This lowers the signal-to-noise ratio of the system as the handset gets farther from the base station.

It is also important that portable telephones have the maximum possible battery life.

SUMMARY OF THE INVENTION

The present disclosure describes a system intended to minimize the above drawback. This is done by adaptively modifying some aspect of reception Linearity performance of the receiver based on transmitted signal power level.

Many LNAs become less linear when driven in a mode where less current is consumed. Most LNAs for portable telephones are driven in this reduced current mode in order to decrease power consumption. The inventor recognized, however, that during the transmitting time, the LNA is still using a lot less power than the HPA. During that time, the current draw of the LNA is not significant compared with the current drawn by the HPA.

The system as described in this specification improves reception sensitivity during the time of simultaneous transmission and reception. However, receiver power consumption during reception-only intervals is preferably not increased. Hence, performance is increased without significant decrease in battery life.

DESCRIPTION OF THE PREFERRED EMBODIMENTS

Figure 3:
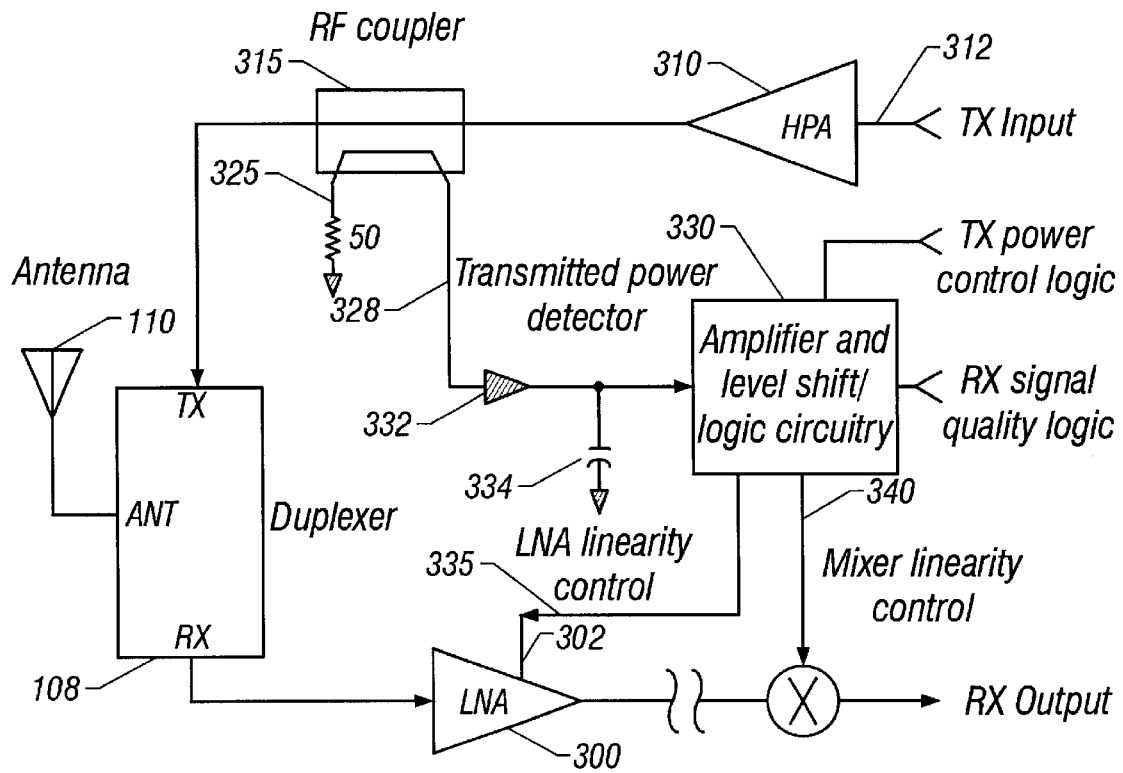
FIG. 3 shows a first embodiment of an adaptive linearity modification system according to the present system.

An embodiment is shown in FIG. 3. Low noise amplifier 300 is an amplifier of a type which includes a linearity control input 302. The linearity control input 302 controls the linearity of the low noise amplifier. The linearity is improved in the preferred embodiment by increasing the bias voltages and/or current and hence increasing the overall power consumption of the low noise amplifier.

The system operates as shown in FIG. 3. HPA 310 receives its transmit input 312 in a conventional way. The HPA 310 transmits when receiving its input. The output of HPA 310 goes through an RF coupler 315 to duplexer 108 which feeds its output to antenna 110.

The receive input from the antenna 110 also feeds through duplexer 108 and is amplified by low noise amplifier 300.

RF coupler 315 includes a pick off portion 325 which produces a signal 328 indicative of the transmitted power. That signal is coupled through a matching network to an amplifier logic network 330.

The amplifier logic network 330 produces LNA linearity control 335 and mixer linearity control 340. Most LNAs including the one described further herein, become more highly linear when they are driven at higher bias levels. These higher bias levels, however, reduce battery life of the handset.

The HPA normally transmits a value close to zero. This value, when increased, is detected by a drop across diode 332 leading to a charging of capacitor 334. When the potential on capacitor 334 exceeds a predetermined level, e.g., one volt, the linearity of the LNA is adjusted.

Figure 4:
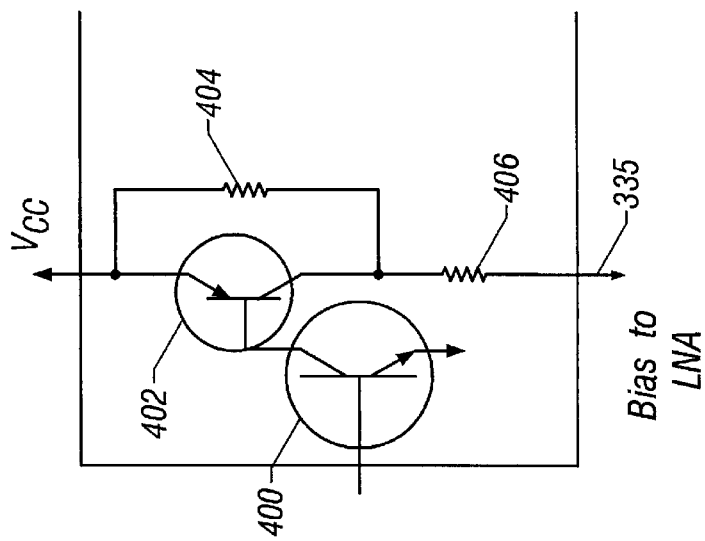
FIG. 4 shows a schematic of a variable bias system.

The bias adjustment circuit is shown in FIG. 4. Bias 335 to LNA 300 can normally be provided across the two resistors 404, 406 which typically provides a bias of about 3–5 ma. This represents the standby current. When the transmitted power detector reaches a sufficient level, transistor 400 is turned on, thereby turning on transistor 402 and shorting across resistor 404. This decreases the resistance to VCC, and thereby produces a higher bias current—preferably upwards of 10's of ma.

Figure 5:
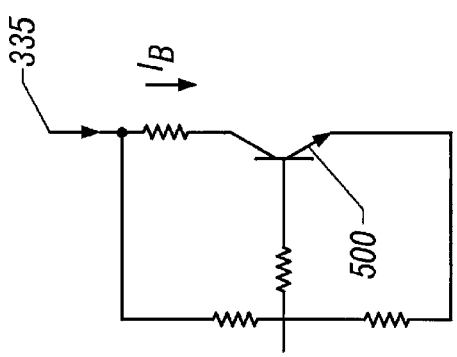
FIG. 5 shows an exemplary LNA with variable current.

The LNA itself is shown in FIG. 5. The signal is amplified by transistor 500 through a bias network produced from the bias system. The higher bias 335 effectively puts a higher current on the collector. This causes the amplifier to operate in a more linear region. Hence, when the HPA is transmitting, which is when intermodulation distortion can be most pronounced, the LNA is made more linear by increasing its bias.

The signal 328 represents whether the transmission is in progress or not. The start of the transmission increases the bias to the LNA to increase linearity thereof. The end of the signal reduces the bias to the LNA. Hence, the LNA is less highly biased while the HPA is not transmitting to reduce overall power consumption.

The above has described a two level operation of either increasing the bias to the LNA or decreasing bias to a standby level. It should be understood that the transistors 400 and 402 could also be biased into their active state allowing adaptive increase and decrease of the bias in accordance with the amount of transmission.

The LNA should be turned on (higher bias mode) prior to HPA transmission and turned off after the transmission. In other words, advanced and delay time are added to the LNA timing so that it encompasses the HPA transmission period. This will minimize the possibility of intermodulation during the transition when the LNA bias is turned on simultaneously with the HPA. In a closed loop communication with the base station, subscriber units will always know when they need to burst or transmit. Thus, increasing the LNA bias prior to the HPA on command can easily be accomplished. This lead and lag time can be in terms of microseconds to milliseconds.

Figure 1:
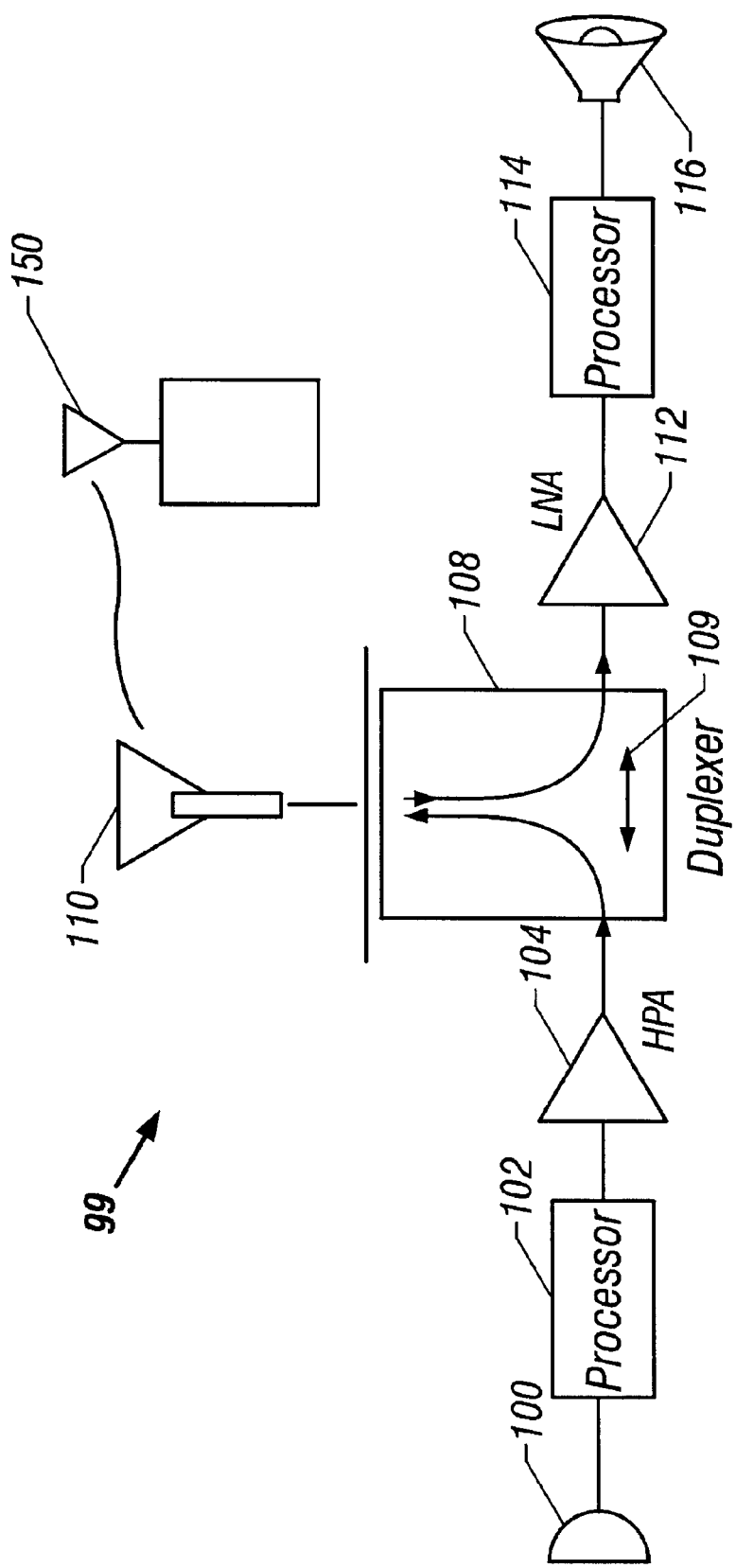
FIG. 1 shows a block diagram of a handset transceiver system.
Figure 2:
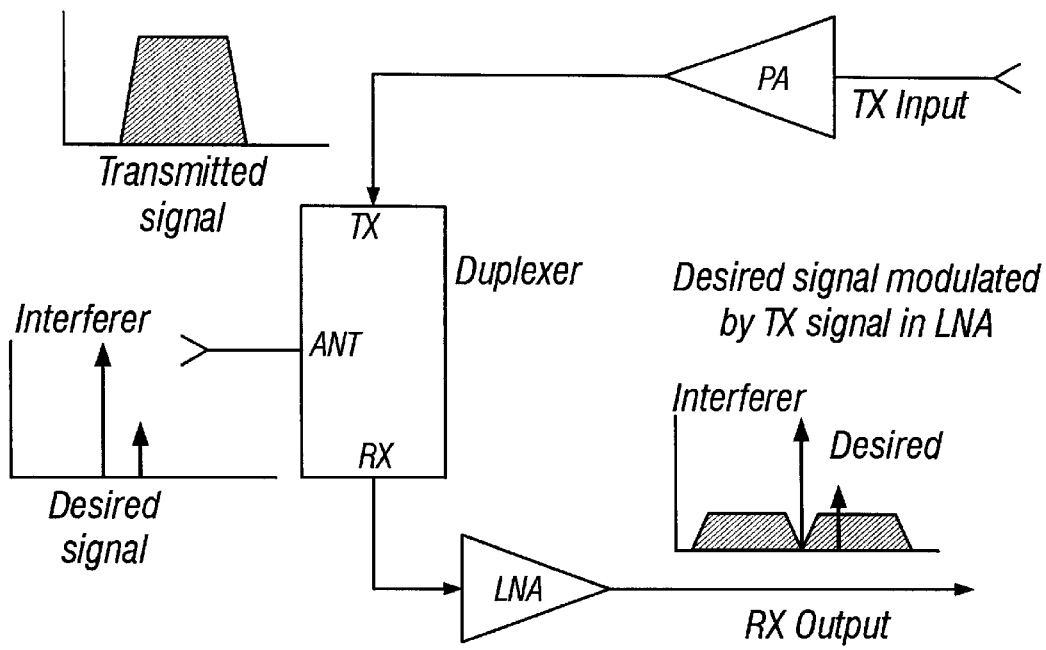
FIG. 2 shows a block diagram with bands of the desired signal and interferer.
Figure 6:
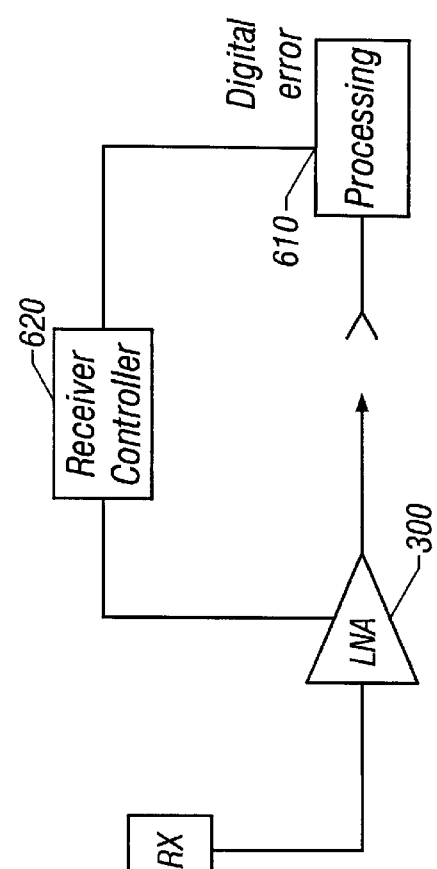
FIG. 6 shows a digital implementation.

An alternative embodiment is shown in FIG. 6. The IS-95 standard carries out certain processing of the received signal. This processing is carried out past the RX output shown in FIG. 1 and is beyond the scope of this patent application. The processing is digital and includes inherent error correcting codes to increase accuracy.

These error correcting codes allow determination of digital error in the receive signal. The digital error output 610 can represent one or both of a bit error rate or frame error rate.

When the digital error goes above a predetermined threshold, the digital error output 610 is produced. This digital error output indicates a possibility of intermodulation distortion and controls receiver controller 620 to increase the bias to LNA 300. The digital error signal can be converted to a proportional analog signal to control the characteristics of the LNA/Mixer.

All of the prior embodiments have described operation with a variable linearity LNA. As described above, this variable linearity LNA can be, for example, simply a low noise amplifier which implements adjustable bias. A specialized LNA can also have variable bias points to vary the third order intercept (IP3) of the amplifier. The LNA can also have variable gain control. Gain control can be accomplished by changing the impedance match of the LNA/ Mixer. Changing of the match can be done in analog or discrete steps of varying a varactor capacitance or switching in/out a matching inductor.

Figure 7:
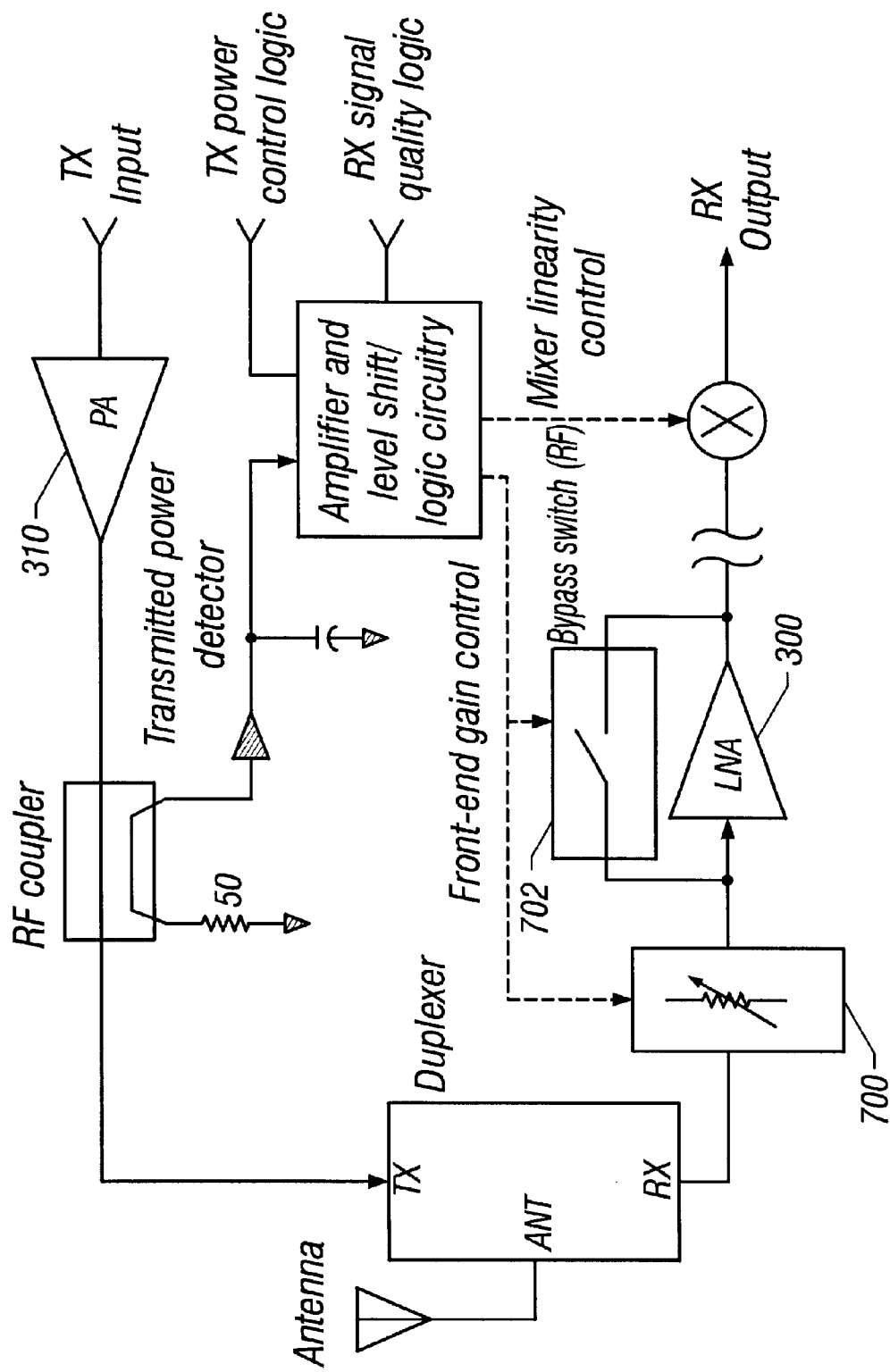
FIG. 7 shows another embodiment with an LNA bypass switch.

Another embodiment is shown in FIG. 7. The inventor recognized that the intermodulation distortion could be decreased by reducing the levels of signals contributing to the signals. This is difficult since reducing the received signal can also reduce the reception.

FIG. 7 uses a variable attenuation system. Variable attenuator 700 and/or LNA bypass 702 are both implemented. Either or both reduce the level of intermodulation distortion.

The control can be similar to the above, or, more preferably, is based on a specific detection of intermodulation distortion.

Other modifications are contemplated and are within the following claims.

What is claimed is:

1. A transceiver system, comprising:
  a variable linearity receiving amplifier, connected to an antenna to receive transmitted information;
  a transmitting amplifier, connected to an antenna to transmit information, said transmitting amplifier, when operating, consuming more power than said variable linearity receiving amplifier; and
  a receiving control circuit, determining when said transmitting amplifier is transmitting and adjusting a receive characteristic of said receiving amplifier only when said transmitting amplifier is transmitting and not adjusting said receive characteristic of said receiving amplifier when said transmitting amplifier is not transmitting.

2. A system as in claim 1, further comprising a bias adjustment circuit, increasing a bias to said receiving amplifier to increase its linearity.

3. A system as in claim 1, wherein said receiving control circuit comprises a transmit power detection system.

4. A system as in claim 1, wherein said receiving control circuit comprises a receive signal error detection system.

5. A transceiver system, comprising:
  a receiving amplifier, connected to an antenna to receive transmitted information;
  a transmitting amplifier, connected to an antenna to transmit information; and
  an intermodulation distortion detector, detecting a condition indicative of intermodulation distortion, and taking an action to reduce said intermodulation distortion only when said condition is detected and said transmitting amplifier is transmitting, and not taking said action when said condition is not detected or when said transmitting amplifier is not transmitting.

6. A system as in claim 5, wherein said action includes increasing a power consumption of the system.

7. A system as in claim 6, wherein said action includes increasing a bias to said receiving amplifier to thereby make said receiving amplifier more linear.

8. A system as in claim 5, wherein said action includes reducing a receive gain of the system.

9. A method of reducing intermodulation distortion in a transceiver system, comprising:
  determining a temporary condition indicative of intermodulation distortion wherein said condition includes that a transmitter is transmitting;
  temporarily taking an action based on said determining, said action being one which reduces said intermodulation distortion; and
  ending said taking an action when said condition is over;
  determining when said transmitting amplifier is transmitting and adjusting a receive characteristic of said receiving amplifier only when said transmitter is transmitting and not adjusting said receive characteristic of said amplifier when said transmitter is not transmitting.

10. A transceiver system for IS-95, comprising:
  a receiving amplifier, connected to an antenna to receive transmitted information;
  a transmitting amplifier, connected to transmit information, said transmitting amplifier, when operating, consuming more power than said receiving amplifier; and
  a receiving control circuit, determining a condition indicative of intermodulation distortion that includes that a transmitting amplifier is transmitting, and adjusting a receive characteristic of said receiving amplifier only when said characteristic is detected and not adjusting said receive characteristic of said amplifier when said characteristic is not detected or said transmitter is not transmitting, said receive characteristic being one that results in less signal being received.

* * * * *